(12) United States Patent
Oundjian

(10) Patent No.: US 7,261,127 B1
(45) Date of Patent: Aug. 28, 2007

(54) MODIFIED PUSH-PULL VALVE FOR FILTER SYSTEMS AND METHOD

(76) Inventor: Sarkis Oundjian, 658 E. Manor Dr., Chandler, AZ (US) 85225

(*) Notice: Subject to any disclaimer, the term of this patent is extended or adjusted under 35 U.S.C. 154(b) by 0 days.

(21) Appl. No.: 11/265,454

(22) Filed: Nov. 2, 2005

(51) Int. Cl.
*F16K 11/07* (2006.01)

(52) U.S. Cl. ............ 137/625.5; 137/269; 210/425

(58) Field of Classification Search ........... 137/269, 137/270, 271, 625.5; 210/425
See application file for complete search history.

(56) References Cited

U.S. PATENT DOCUMENTS

| | | | | |
|---|---|---|---|---|
| 2,553,458 A | * | 5/1951 | Jordan | 137/625.29 |
| 3,195,726 A | * | 7/1965 | Saurenman et al. | 210/167.14 |
| 3,365,064 A | * | 1/1968 | Horan, Jr. | 210/167.13 |
| 3,643,692 A | * | 2/1972 | Traylor | 137/599.15 |
| 3,683,961 A | * | 8/1972 | Launay et al. | 137/625.5 |
| 3,779,280 A | * | 12/1973 | Evans et al. | 137/625.5 |
| 4,055,500 A | * | 10/1977 | Parker | 210/412 |
| 4,250,920 A | * | 2/1981 | Traylor | 137/625.29 |
| 4,466,457 A | * | 8/1984 | Brane et al. | 137/599.12 |
| 4,469,131 A | * | 9/1984 | Traylor | 137/599.14 |
| 4,714,551 A | * | 12/1987 | Bachhofer et al. | 210/278 |
| 6,575,195 B2 | * | 6/2003 | Wichmann | 137/625.17 |
| 6,578,605 B2 | * | 6/2003 | Cooper et al. | 137/625.5 |

* cited by examiner

*Primary Examiner*—John Fox
(74) *Attorney, Agent, or Firm*—Parsons & Goltry; Robert A. Parsons; Michael W. Goltry

(57) ABSTRACT

A valve assembly is constructed for use in a filtering system including a pump and a filter with an inlet and an outlet, for example those systems used in conjunction with swimming pools. The assembly includes a valve body with a pump inlet, a filtered output, a waste-water disposal outlet, a filter inlet, and a filter outlet. Pairs of a plurality of plunger heads are positioned within the valve body to provide a plurality of modes of operation, the pairs of plunger heads being positioned within the valve body in one of a filtering mode, a backwash mode, and a direct mode in which flow from the pump is directly into the waste-water disposal outlet. The pairs can be affixed on two different interchangeable plungers or moveably positioned on a single plunger.

7 Claims, 5 Drawing Sheets

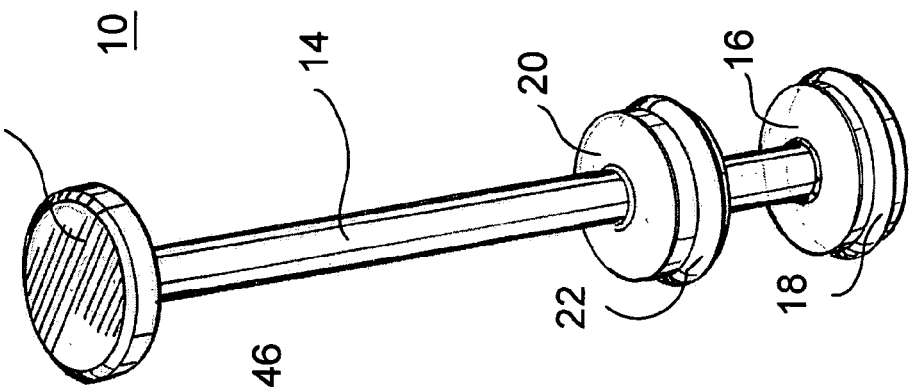
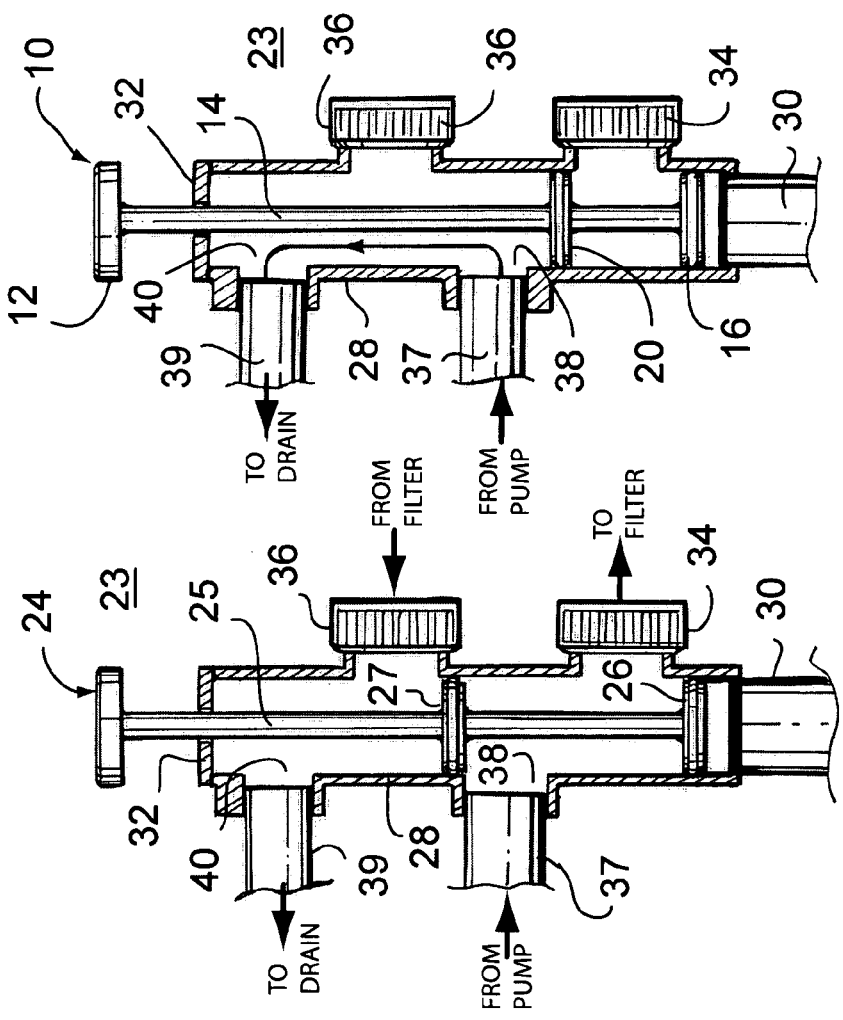

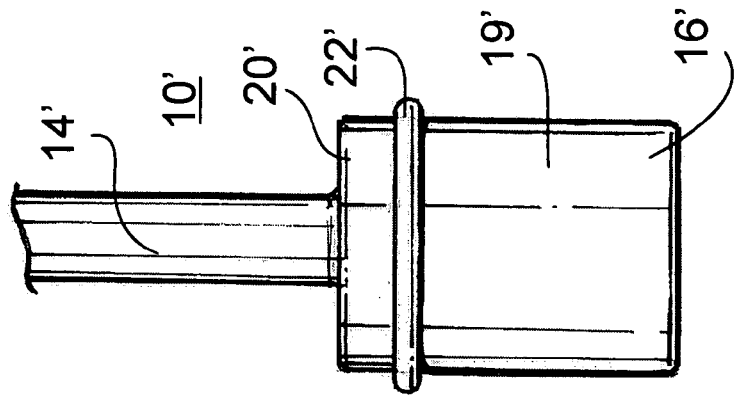
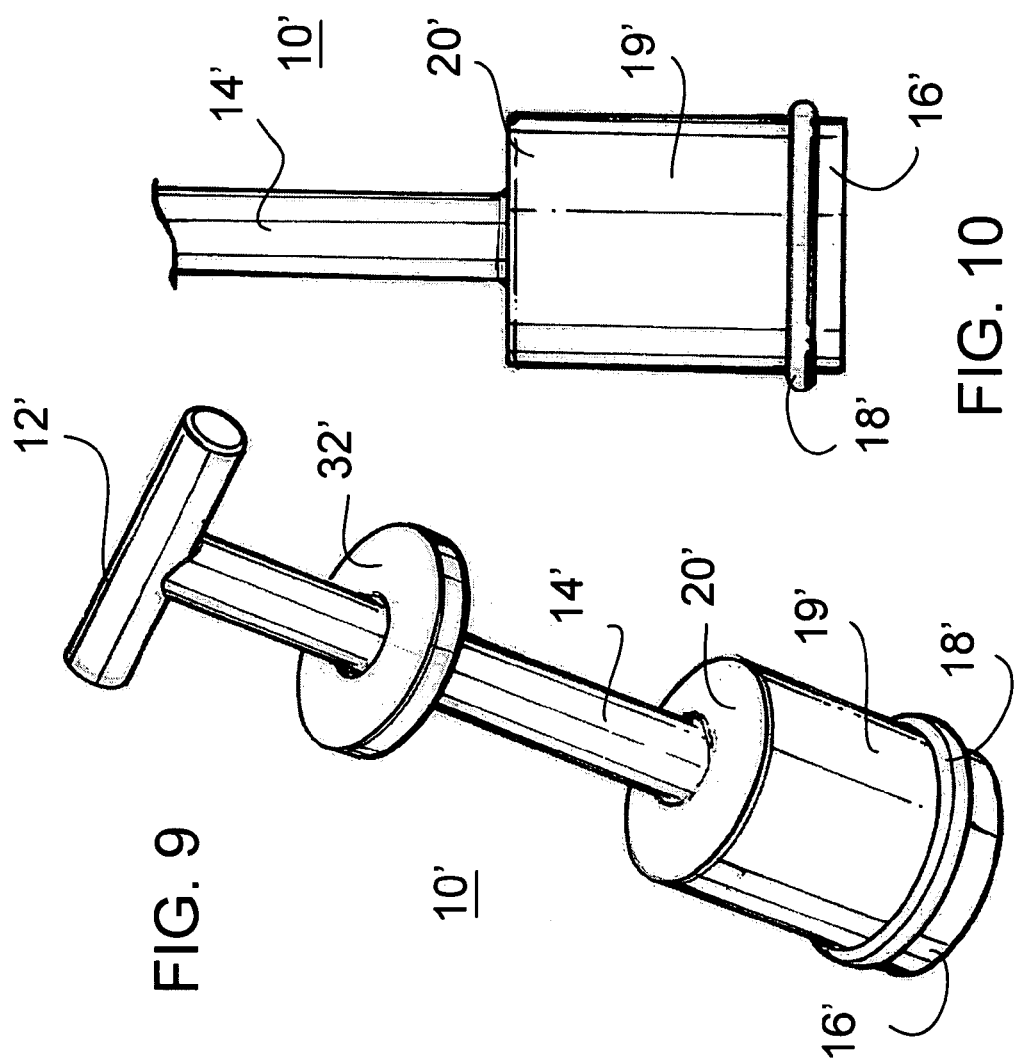

MODIFIED PUSH-PULL VALVE FOR FILTER SYSTEMS AND METHOD

FIELD OF THE INVENTION

This invention relates in general to valves used in swimming pool filter systems and the like and methods of use.

BACKGROUND OF THE INVENTION

Swimming pool filter systems generally include a filter pump and a filter, such as a sand filled tank, DE filter, etc. a two-position push-pull valve is included to switch the system between a filtering mode and a backwash mode of operation. In the filtering mode of operation, water is pumped from the pool and directed through the filter in a filtering direction and the filtered water is directed back into the pool. When enough foreign matter accumulates in the filter to reduce the pumping action, the filter is backwashed, i.e., water is directed from the pool through the filter in the opposite direction and then into a drain or other waste-water receptacle. Generally, a filter can be cleaned by backwashing for several minutes. The system is then switched back into the filtering mode.

Periodically, the pool is cleaned by vacuuming the bottom and sides to remove any accumulated foreign materials that are not otherwise drawn into the filtering system. To perform this task one end of a hose is inserted into the drain in the skimmer and the other end is moved across the bottom and sides of the pool to draw any foreign materials into the filtering system. During vacuuming the filter system is simply operated in the filter mode. When the vacuuming is completed the filtering system is moved into the backwash mode and when the backwash is completed the filter is moved into the filtering mode.

A problem arises with this system when relatively large amounts of foreign materials, e.g. dust, leaves, etc., is blown into the pool. When large amounts of foreign materials are present in a pool, it may not be possible to completely clean the pool with one vacuuming. The filter may become so clogged with foreign material that the vacuum drops to near zero and little or no additional material can be removed from the pool. In such cases the vacuuming hose must be removed from the skimmer and a backwashing cycle must be performed. The vacuuming hose is then reinserted, a vacuum is established and the cleaning can proceed. In some instances this procedure needs to be repeated several times, which is laborious and time consuming. Also, during the repetitions, dirt and other foreign material can reenter the pool from the vacuuming hose, the filter, etc. In addition, fine dirt particles (e.g. dust and the like) can pass right through many of the popular filters, such as sand filters, and simply be returned to the pool. Thus, the vacuuming process can be inefficient, time consuming, and frustrating.

It would be highly advantageous, therefore, to remedy the foregoing and other deficiencies inherent in the prior art.

Accordingly, it is an object of the present invention to provide a new and improved modified push-pull valve for filtering systems and the like.

It is another object of the present invention to provide a new and improved modified plunger to convert push-pull valves into three mode operation, i.e. filtering mode, backwash mode, and direct flow to drain mode.

Another object of the invention is to provide a new and improved modified push-pull valve that is relatively inexpensive and easy to install and operate.

Another object of the invention is to provide a new and improved modified push-pull valve and method of operation that can substantially simplify and improve the filtering operation.

Another object of the invention is to provide a new and improved modified push-pull valve that can be adapted to most of the filtering systems without additional cost or special equipment.

SUMMARY OF THE INVENTION

Briefly, to achieve the desired objects of the instant invention in accordance with a preferred embodiment thereof, provided is a valve assembly constructed for use in a filtering system including a pump and a filter with an inlet and an outlet, for example those systems used in conjunction with swimming pools. The assembly includes a valve body with a pump inlet, a filtered output, a waste-water disposal outlet, a filter inlet, and a filter outlet. Pairs of a plurality of plunger heads are positioned within the valve body to provide a plurality of modes of operation, the pairs of plunger heads being positioned within the valve body in one of a filtering mode, a backwash mode, and a direct mode in which flow from the pump is directly into the waste-water disposal outlet. The pairs can be affixed on two different interchangeable plungers or moveably positioned on a single plunger.

BRIEF DESCRIPTION OF THE DRAWINGS

The foregoing and further and more specific objects and advantages of the invention will become readily apparent to those skilled in the art from the following detailed description taken in conjunction with the drawings in which:

FIG. 1 is a perspective view of a modified push-pull valve plunger in accordance with the present invention;

FIG. 2 is a partial cut-away view illustrating a push-pull valve with a standard plunger in the backwash mode;

FIG. 3 is a partial cut-away view illustrating the modified push-pull valve of FIG. 1 installed in the direct waste-water mode;

FIG. 9 is a perspective view, similar to FIG. 1, of another embodiment of a modified push-pull valve plunger in accordance with the present invention;

FIG. 10 is a partial side plan view of the modified push-pull valve plunger of FIG. 9; and FIG. 11 is a partial side plan view of a variation of the modified push-pull valve plunger of FIG. 9 in accordance with the present invention.

DETAILED DESCRIPTION OF THE DRAWINGS

Figure 4:
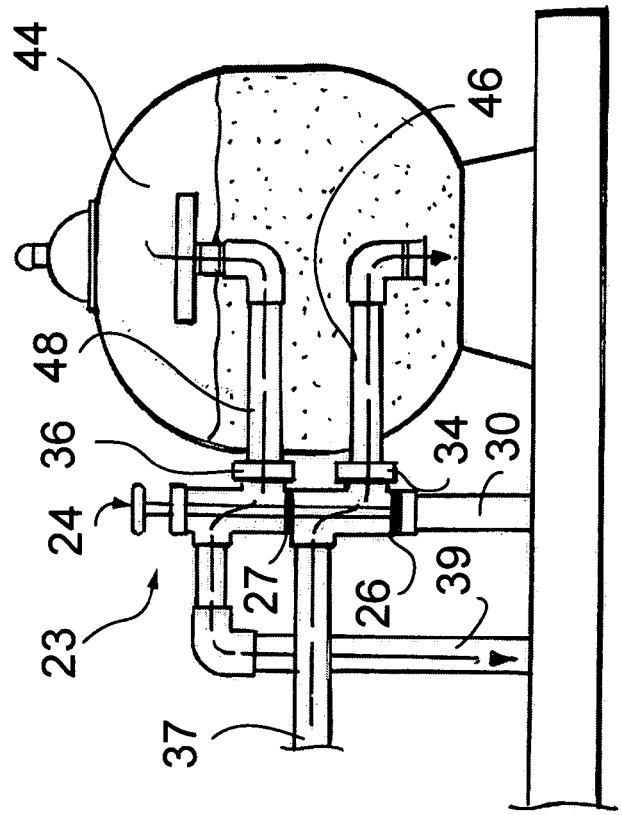
FIG. 4 is a partial cut-away view illustrating the valve of FIG. 2 installed in a sand-filter filtering system and in the filtering mode.

Turning now to the drawings in which similar components are designated with similar numbers throughout, attention is first directed to FIG. 1 which illustrates a modified push-pull valve plunger 10 in accordance with the present invention. Plunger 10 includes a handle 12 affixed to an upper end of a shaft 14. It will be understood that handle 12 is illustrated as disk shaped in this embodiment for simplicity but could have any convenient shape. A first plunger head 16 is positioned adjacent to the lower end of shaft 14 and in this preferred embodiment is fixed in that position.

In this preferred embodiment, plunger head 16 is generally disk shaped and has an O-ring 18 extending circumferentially around the periphery of head 16. Head 16 and O-ring 18 are designed to slide longitudinally within a pipe or valve body of a selected dimension and to prevent water from flowing past head 16. For example, in a pipe or valve body with a 1.5", 2", 2.5", etc. diameter, head 16 will be constructed with a diameter slightly smaller than 1.5", 2", 2.5", etc., respectively, and O-ring 18 will seal head 16 against the inner wall of the pipe or valve body.

A second plunger head 20 is positioned midway along shaft 14. In this preferred embodiment plunger head 20 is fixed to shaft 14, but it will be understood from the following explanation that plunger head 20 could be longitudinally movable along shaft 14 into at least two different positions. In this preferred embodiment, plunger head 20 is generally disk shaped and has an O-ring 22 extending circumferentially around the periphery of head 20. Head 20 and O-ring 22 are designed to slide longitudinally within a pipe or valve body of a selected dimension and to prevent water from flowing past head 20. Generally, the diameter of head 20 will be similar to the diameter of head 16, although in some specific filter systems this may vary. As will be explained in more detail below, when plunger head 20 is movable the manner and structure for moving plunger head 20 from one position to another can vary according to the specific application or preference of the manufacturer.

Turning now to FIG. 2, a standard push-pull valve 23 is illustrated with a standard plunger 24 operatively engaged therein. Valve 23 has a vertically elongated cylindrical body 28, the lower end of which is internally threaded to engage a pipe 30 that communicates with a swimming pool or the like (not shown). The upper end of body 28 is closed by means of a cap or index plate 32 that has a centrally located hole for receiving shaft 25 of plunger 24 longitudinally movably therethrough. A first radially extending opening 34, in this embodiment includes a bulkhead fitting for threaded attachment to a filter inlet (shown in FIG. 4). A second radially extending opening 36, in this embodiment includes a bulkhead fitting for threaded attachment to a filter outlet (shown in FIG. 4). A pipe 37 that communicates with a pump (shown in FIG. 6) is engaged in another radially extending opening 38. A pipe 39 that communicates with a drain (shown in FIG. 4) is engaged in another radially extending opening 40. As will be understood by those skilled in the art, the various pipes and connections can be threadedly engaged or they can be affixed by adhesive or the like (e.g. plastic pipes) in a well known manner.

In the specific mode of operation illustrated in FIG. 2, plunger head 26 is positioned to close or prevent communication between body 28 and pipe 30. Also, plunger head 27 is positioned between opening 36 and opening 38. Thus, water from the pump enters body 28 through opening 38 and is forced to flow into the filter through opening 34. The water then flows through the filter and into body 28 through opening 36. Because of the position of plunger head 20, the water is forced to flow out of body 28 through opening 40 and thence to the drain.

Figure 5:
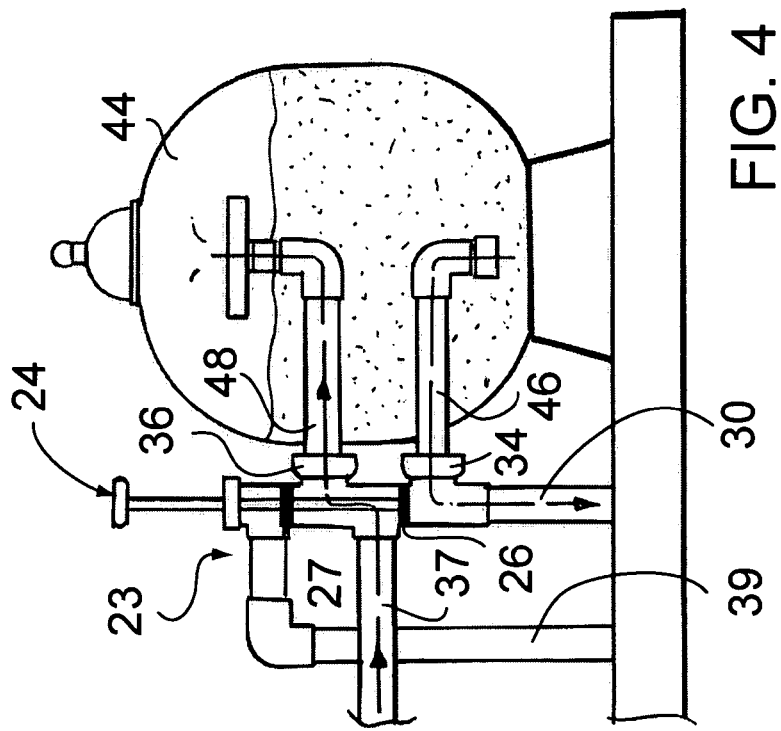
FIG. 5 is a partial cut-away view illustrating the valve of FIG. 2 moved into the backwash mode.

Referring additionally to FIG. 5, a sand filter is illustrated coupled to valve 23 with opening 34 coupled to a filter outlet 46 (i.e. an outlet for filtered water) and opening 36 coupled to a filter inlet 48 (i.e. an inlet for unfiltered water). However, in the operational mode illustrated in FIGS. 2 and 5, water enters filter 44 through outlet 46 and exits through inlet 48, which is understood in the art to be the backwash mode of operation.

Turning now to FIG. 4, plunger 24 within body 28 of valve 23 is moved so that plunger head 26 is positioned between opening 34 and opening 38 (pipe 37) and plunger head 27 is positioned between opening 36 and opening 40 (pipe 39). In this mode of operation water from the pump in pipe 37 flows out of opening 36 and into the inlet 48 of filter 44. The water flows through filter 44, out of the outlet 46, and into opening 34 in valve 23. The water then flows into pipe 30 and thence into the swimming pool. Thus, in this position of plunger 10 within valve 23 the filtering system is in the filtering mode of operation. It will be understood by those skilled in the art that the backwash mode of FIG. 5 and the filtering mode of FIG. 4 are the only positions or modes possible with plunger 24.

Figure 6:
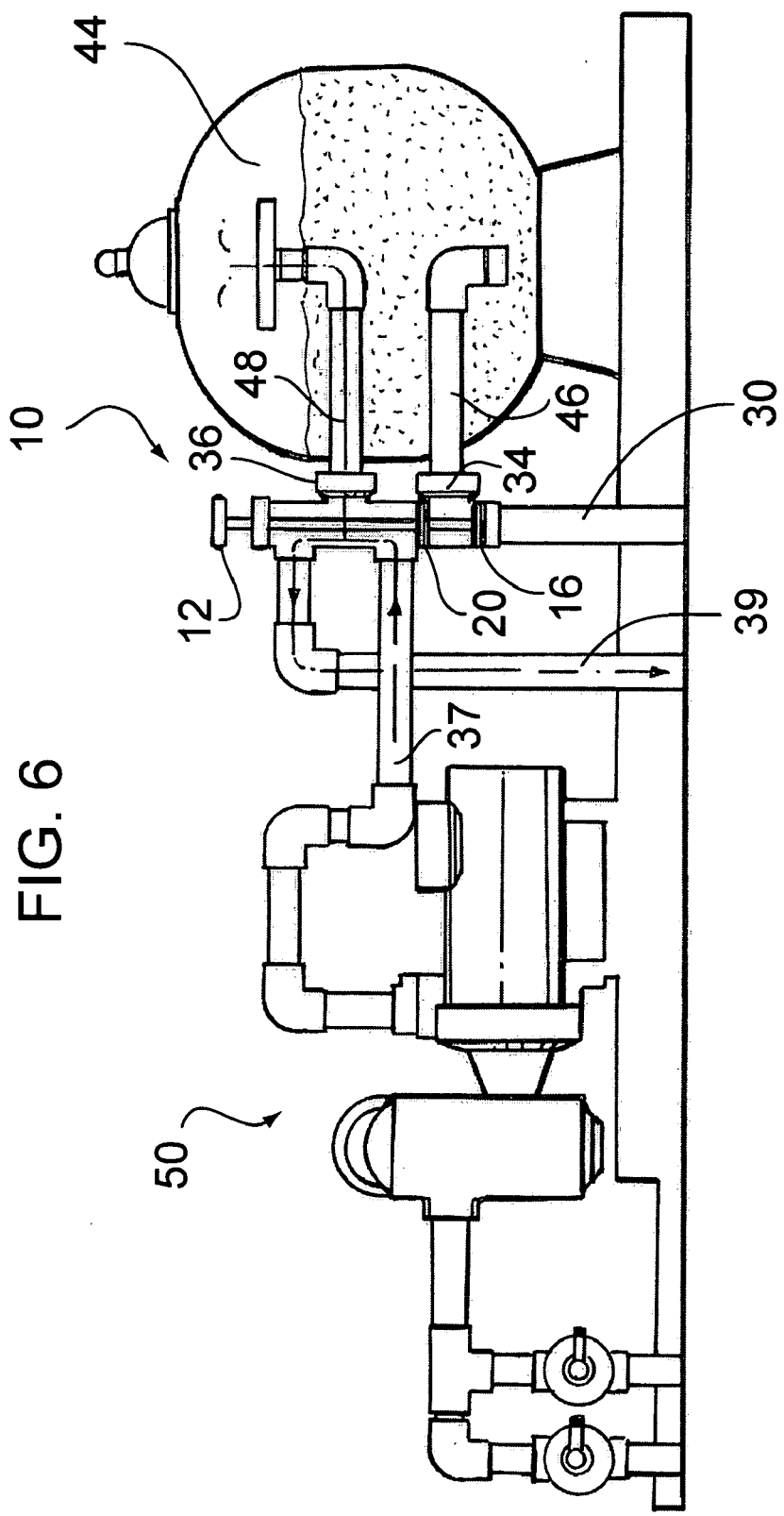
FIG. 6 is a partial cut-away view illustrating the modified valve of FIG. 1 installed in the sand-filter filtering system to provide a direct waste-water mode.

Referring now to FIGS. 3 and 6, plunger 24 is removed and replaced with modified plunger 10 within body 28 of valve 23. Modified plunger 24 is constructed so that plunger head 16 closes or prevents communication between body 28 and pipe 30 and plunger head 20 is positioned between opening 34 and opening 38 (pipe 37). This modified positioning of plunger heads 16 and 20 produces a third mode of operation herein referred to as a direct mode in which flow from the pump is directly into the waste-water disposal outlet. In this mode of operation water from a pump, generally designated 50, flows in pipe 37, out of opening 38, and into body 28. Plunger head 20 prevents the water from flowing downwardly toward openings 34 and pipe 30. Also, because plunger head 20 effectively prevents water from flowing out of opening 34 from filter 44, water cannot flow into opening 36, assuming filter 44 is filled with water. Thus, the water entering body 28 from pump 50 through pipe 37 must flow out of opening 40 and pipe 39 to the drain. In this mode of operation valve 23 causes water to flow from pump 50 directly into the drain or other waste-water receptacle (e.g. the ground, etc.).

In this direct mode of operation the person cleaning the pool has one end of a vacuum hose inserted into the skimmer and a standard vacuuming device attached to the other end. Assuming, for example, the pool has a great deal of foreign matter (especially fine dirt particles or dust), the operator can continue to vacuum until the pool is completely clean. Since the dirty water flows directly into a drain or other waste-water receptacle (e.g. the ground, trees, bushes, etc.), filter 44 does not become clogged. Once the pool is clean the operator can simply remove plunger 10 from valve 23, replacing it with plunger 24, thereby converting valve 23 to the filtering/backwashing modes of operation (FIGS. 4 and 5).

Figure 7:
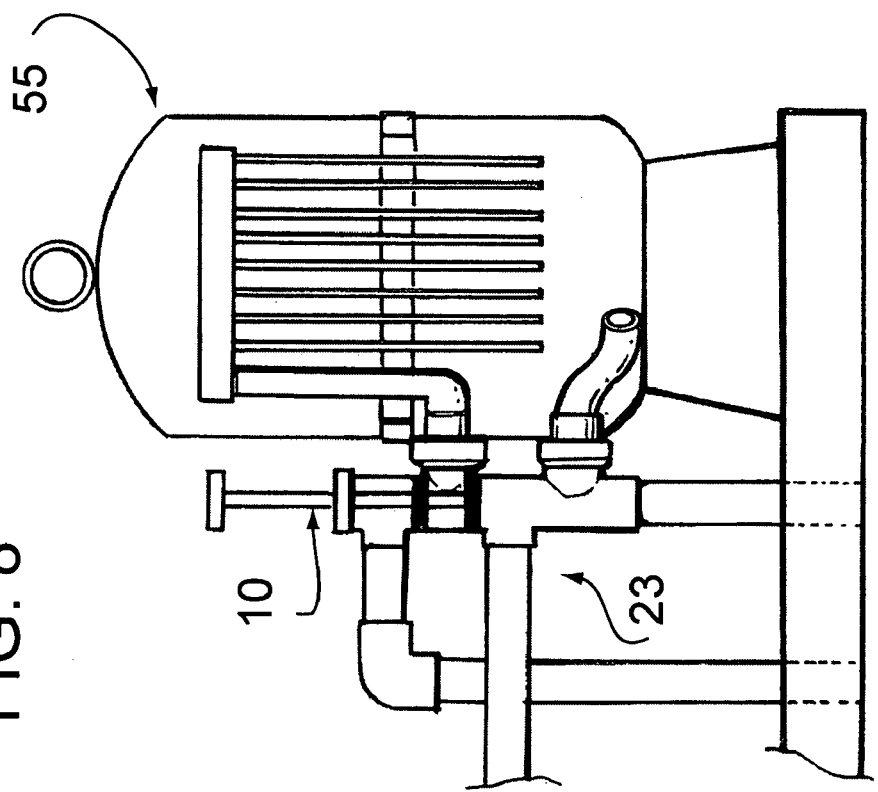
FIG. 7 is a partial cut-away view illustrating the valve of FIG. 2 installed in a DE filtering system and in the filtering mode.
Figure 8:
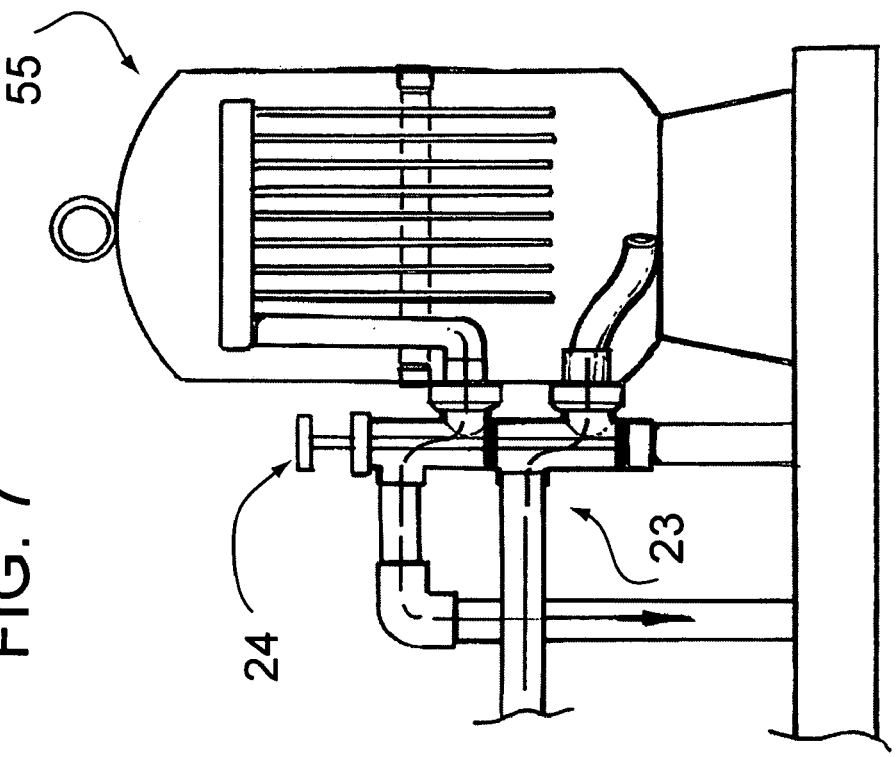
FIG. 8 is a partial cut-away view illustrating the modified valve of FIG. 1 installed in the DE filtering system to provide a direct waste-water mode.

Referring to FIGS. 7 and 8, valve 23 is used to couple to a standard DE filter 55. Valve 23 is positioned in the filtering mode of operation in FIG. 7 and, as explained above, can be operated in the backwash mode (not shown). By simply replacing plunger 24 with modified plunger 10, as illustrated in FIG. 8, valve 23 is provided with the direct mode of operation in which waste water goes directly to a drain or the like, without passing through DE filter 55. Here it should be noted that the filtering and backwash modes of operation in a DE filter are substantially the reverse of flows in the sand filter (i.e. FIGS. 4-6). Since modified plunger 10 is positioned to seal opening 36, rather than opening 34 (see FIG. 6), plunger 10 is either inserted into valve 23 a shorter distance, shortened for DE filters, or provided with several stops or indicators for different types of filters. While only sand filters and DE filters are illustrated in these examples, it will be understood by those skilled in the art that the disclosed valve and plunger could be used with substantially any type of filter.

Generally, body 28 of valve 23 is standard equipment in many filtering systems. However, in such filtering systems the plunger simply has two immovable heads (relative to each other) that either place the system in the filtering or the backwash modes of operation. None of these systems allow dirty water to be pumped directly to a waste-water drain or other disposal area. Thus, in all vacuuming and other operations the filter is in the flow of water.

Turning to FIGS. 9 and 10, another embodiment, designated plunger 10', of plunger 10 is illustrated. In plunger 10' components similar to plunger 10 are designated with similar numbers having a prime (') added to indicate the different embodiment. Plunger 10' includes a handle 12' affixed to an upper end of a shaft 14'. It will be understood that handle 12' is illustrated as a perpendicularly oriented elongated member in this embodiment for simplicity but could have any convenient shape. A cylindrically shaped member 19' is positioned coaxially adjacent the lower end of shaft 14' and replaces or integrates first plunger head 16', positioned adjacent to the lower end of shaft 14' and second plunger head 20' positioned midway along shaft 14'. A cap or index plate 32' that has a centrally located hole for receiving shaft 14' of plunger 10' is illustrated as a permanent component of plunger 10' to enhance the positioning within valve 23.

In this embodiment, cylindrically shaped member 19' simplifies the fabrication of plunger 10', when heads 16' and 20' are fixed in position. A single O-ring 18' adjacent the lower end of cylindrically shaped member 19' (head 16') or O-ring 22' adjacent the upper end of cylindrically shaped member 19' (head 20'), as illustrated in FIG. 11, extends circumferentially around the periphery of cylindrically shaped member 19'. Head 16' and O-ring 18' or 22' are designed to slide longitudinally within a pipe or valve body of a selected dimension and to prevent water from flowing past cylindrically shaped member 19'. Here it will be understood by those skilled in the art that while cylindrically shaped member 19' is constructed as a single component it is considered as two integrated heads for purposes of this invention.

It will be understood by those skilled in the art that plunger 10 can be constructed in a variety of ways including an embodiment with fixed plunger heads and an embodiment with at least one movable plunger head. In the fixed plunger head embodiment, described above, standard plunger 24 is simply removed and replaced with plunger 10 or plunger 10' when direct flow of waste water to a drain or the like is desired. Upon completion of this mode of operation, plunger 10 or plunger 10' is removed and replaced with plunger 24 for normal filtering/backwash operation.

In the movable plunger head embodiment, plunger head 20 is movable between multiple available positions and a direct mode is available, along with the standard filtering and backwash modes. For example, plunger head 20 could be mounted on a tubular shaft, accessible external to body 28, positioned coaxially over shaft 14 and movable longitudinally therealong between the provided positions. Thus, longitudinal movement of shaft 14 would move both plunger heads 16 and 20, and longitudinal movement of the tubular shaft would move plunger head 20 relative to plunger head 16. In yet another embodiment, shaft 14 could include a series of stops that are selectively engagable by plunger head 20 upon rotation of handle 12 to move to and/or hold plunger head 20 in a selected position. In yet another embodiment, plunger head 20 could be manually movable between the provided positions and the mode of operation of valve 23 could be changed by removing plunger 10 from body 28, manually moving plunger head 20, and re-installing plunger 10 in body 28.

Whether the two plungers (e.g. plungers 10 or 10' and 24) are provided and alternated to produce the three modes of operation or a single plunger with movable heads is provided, the operation is substantially similar. Pairs of a plurality of plunger heads are provided that can be easily installed, alternated, or moved within the valve body to provide a plurality of modes of operation. The pairs of plunger heads are positioned within the valve body in one of a filtering mode, a backwash mode, and a direct mode in which flow from the pump goes directly into the waste-water disposal outlet. In this fashion an extremely dirty pool, for example, can be cleaned without including the filter in the water flow and by directly disposing of the dirty water into a drain or the like. The valve can then be reconfigured or moved into the normal filtering/backwashing operation.

Thus, a new and improved modified push-pull valve for filtering systems and the like has been disclosed. The new and improved modified push-pull valve allows a filtering system to be placed in a waste-water disposal mode of operation in which the filter is bypassed to greatly simplify various operations. The new and improved modified push-pull valve is relatively inexpensive to install and operate and can substantially simplify some pool cleaning operations. Generally, the new and improved modified push-pull valve can be adapted to most of the filtering systems in present use without additional cost or special equipment (other than the modified plunger).

Various changes and modifications to the embodiments and methods of operation herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A method of operating a filtering system including a pump and a filter with an inlet and an outlet, the method comprising the steps of;

providing a valve assembly including a valve body and a plurality of plunger heads positionable within the valve body;

positioning pairs of the plurality of plunger heads within the valve body to provide a plurality of modes of operation, the pairs of plunger heads being positioned within the valve body in one of a filtering mode, a backwash mode, and a direct mode in which flow from the pump is directly into the waste-water disposal outlet; and the step of providing the plurality of plunger heads includes providing a first plunger with a first pair of plunger heads thereon, the first plunger being movable between the filtering and the backwash modes of operation, and providing a second plunger with a second pair of plunger heads thereon positioned in the direct mode of operation, and the step of positioning includes positioning the first plunger in the valve body for movement between the filtering and the backwash modes of operation and replacing the first plunger with the second plunger to provide the direct mode of operation.

2. A method as claimed in claim 1 wherein the step of providing a plurality of plunger heads includes providing a plunger including a first head movable with the plunger between first and second positions and a second head movable between at least three positions with each different position of the second head defining a different mode of operation and the step of positioning includes positioning the plunger in the valve body with the first head and the second head in one of the filtering mode, the backwash mode, and the direct mode of operation.

3. A valve assembly with a valve body for use in a filtering system including a pump and a filter with an inlet and an outlet, the valve assembly including a plurality of plunger heads positionable within the valve body, pairs of the plurality of plunger heads being positionable within the valve body to provide a plurality of modes of operation, the pairs of plunger heads being positioned within the valve body in one of a filtering mode, a backwash mode, and a direct mode in which flow from the pump is directly into the waste-water disposal outlet, wherein a first pair of plunger heads are affixed to a first plunger movable between a filtering mode and a backwash mode and a second pair of plunger heads are affixed to a second plunger so as to provide the direct mode of operation, the first plunger being interchangeable with the second plunger to provide the filtering mode, the backwash mode, and the direct mode of operation.

4. A valve assembly as claimed in claim 3 wherein the second pair of plunger heads affixed to the second plunger are integrated into a single cylindrically shaped member.

5. In combination with a valve assembly having a valve body used in a filtering system including a pump and a filter with an inlet and an outlet, the valve assembly including a first plunger with a first pair of heads positionable within the valve body into one of a filtering mode and a backwash mode, the valve assembly including the improvement comprising a second plunger with a second pair of heads positionable within the valve body in a direct mode in which flow from the pump is directly into the waste-water disposal outlet, the second plunger being exchangeable with the first plunger.

6. The second plunger as claimed in claim 5 wherein the second pair of heads of the second plunger are integrated into a single cylindrically shaped member.

7. The second plunger as claimed in claim 5 wherein the second pair of heads of the second plunger include a fixed head movable with the second plunger between first and second positions and a movable head movable between at least three positions with each different position of the second head defining a different mode of operation including a filtering mode, a backwash mode, and a direct mode of operation.

* * * * *